(12) United States Patent
Watts

(10) Patent No.: US 12,729,952 B1
(45) Date of Patent: Sep. 8, 2026

(54) MEASUREMENT METHOD AND APPARATUS

(71) Applicant: United States Pipe and Foundry Company, LLC, Birmingham, AL (US)

(72) Inventor: Kenneth J. Watts, Alpine, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 0 days.

(21) Appl. No.: 19/541,866

(22) Filed: Feb. 17, 2026

(51) Int. Cl.
*G01B 11/12* (2006.01)
*G01B 11/24* (2006.01)

(52) U.S. Cl.
CPC .......... *G01B 11/12* (2013.01); *G01B 11/2408* (2013.01)

(58) Field of Classification Search
CPC ............................ G01B 11/12; G01B 11/2408
See application file for complete search history.

(56) References Cited

U.S. PATENT DOCUMENTS 3,959,887 A * 6/1976 Seidel ...................... G01B 3/46 29/415
4,711,037 A * 12/1987 Saadat ..................... G01B 5/00 33/544.5
6,580,449 B1 * 6/2003 Meltzer ................. E21B 47/002 356/241.1
8,881,420 B2 * 11/2014 Colombo ................. G01B 5/12 33/542
2005/0081396 A1 * 4/2005 Coulombe ............... G01B 5/12 33/542

FOREIGN PATENT DOCUMENTS

AU 2023263449 A1 * 6/2024 ............... G01V 3/18

* cited by examiner

*Primary Examiner* — Yaritza Guadalupe-Mccall
(74) *Attorney, Agent, or Firm* — Jacob W. Neu; Bradley Arant Boult Cummings LLP

(57) ABSTRACT

An apparatus and method of measuring the inside surface of an object such as a pipe. The method includes capturing an image of the three dimensional interior pipe including an array of points of light projected by lasers from a mount positioned within the pipe, coplanar with the surface to be measured. The image is converted to a two dimensional array and analyzed to determine the dimensions of the interior surface of the pipe on the plane on which the points of light were projected.

16 Claims, 4 Drawing Sheets

MEASUREMENT METHOD AND APPARATUS

TECHNICAL FIELD

Embodiments of the present invention relate generally to a method and apparatus for measuring the interior of pipe or similar object with a generally cylindrical cross section at any desired location.

BACKGROUND

When manufacturing objects designed to have a cylindrical cross section such as pipes, it is helpful for quality control and other purposes to measure the object's dimensions as actually produced to ensure conformity to design and specifications. This is especially true when the object has a complex interior surface, such as the bell of a ductile iron pipe used in pressurized water distribution. FIG. 1 shows in dashed lines the cross section of an exemplary pipe bell, the interior of which is designed to facilitate a secure joint when joined to a complementary spigot end of another pipe, as known in the art. Because the interior dimensions of the pipe bell typically vary across its several functional structures, obtaining precise measures of surface contours with a contact-based measurement system can be challenging. A non-contact measurement system that can be moved longitudinally in the pipe to capture the interior surface at any point along its length would be desirable.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A preferred embodiment of the apparatus of the present disclosure, for measuring the interior surface of a longitudinal object such as a pipe, comprises an array of radial lasers comprising at least four lasers oriented radially with respect to the longitudinal axis of the pipe and disposed upon a mount adapted to be positioned axially within the pipe, wherein three of the radial lasers are positioned to project points of light upon the interior surface of the pipe. The points of light are consecutively spaced proximate to one another and the fourth laser is positioned to project a point of light substantially diametrically opposed thereto. The points of light projected by the radial lasers form a radial array of points of light upon the interior surface of the pipe. The embodiment also includes two parallel lasers disposed upon the mount, oriented parallel to one another, and they are configured to project two points of light upon the interior surface of the pipe a predetermined distance apart. The points of light projected by the radial lasers and parallel lasers are coplanar. The embodiment further includes a camera positioned to capture an image of the points of light projected by the radial laser array and the parallel lasers. A processor receives image data from the camera and is configured to convert length in the image to length along the interior surface of the pipe using the predetermined distance between the two parallel points, defines a curve connecting the three consecutive points of the radial array; and determines a maximal distance between the curve and the fourth point of the radial array. This maximal distance is the diameter of the pipe. The mount may be movable longitudinally along a path parallel to the axis of the pipe, and in a further preferred embodiment, is attached to a robotic arm. Preferably, the radial array of lasers comprises a plurality of sets of at least four lasers, such as eight sets of four lasers, and the processor is configured to repeating the defining step and the determining step for each of the sets.

A preferred embodiment of the method of the present disclosure, for measuring an interior surface of a pipe, includes projecting upon the interior surface of the pipe an array of at least four points of light radially spaced apart, wherein three of the radial points are consecutively spaced proximate one another and the fourth point is substantially diametrically opposed thereto; projecting upon the interior surface of the pipe from parallel sources two points of light a predetermined distance apart; capturing an image of the radial array and the parallel points of light; converting length in the image to length along the interior surface of the pipe using the predetermined distance between the two parallel points; from the image, defining a curve connecting the three consecutive points of the radial array; and determining a maximal distance between the curve and the fourth point of the radial array, wherein the maximal distance is the diameter of the pipe. The curve may be defined using Lagrangian polynomials. Each step of the process may be repeated at a plurality of locations along the longitudinal axis of the pipe.

BRIEF DESCRIPTION OF THE DRAWINGS

The accompanying drawings, which are incorporated in and constitute a part of the specification, illustrate exemplary embodiments of the disclosure. A more complete understanding of these and other embodiments of the present invention may be obtained by reference to the following Detailed Description when taken in conjunction with the accompanying Drawings wherein.

DETAILED DESCRIPTION OF ILLUSTRATIVE EMBODIMENTS

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

In addition, as used herein, the term "coupled" may include direct or indirect coupling by any means, including moving and/or non-moving mechanical connections. In this disclosure, the term "axial" refers to the longitudinal axis in a pipe or similar structure, the term "radial" is perpendicular to the axis, and the term "circumferential" refers to angular position, motion, or direction around a centerline that is parallel to the longitudinal axis of a pipe or similar structure. Additionally, the terms "about" or "approximately" mean within a range of reasonable error around a central value. Such reasonable error may, for example, stem from the precision of an instrument or method used to measure the value. For example, in some contexts, these terms may mean±/−10%. In others, these terms may mean±20%.

Figure 1:
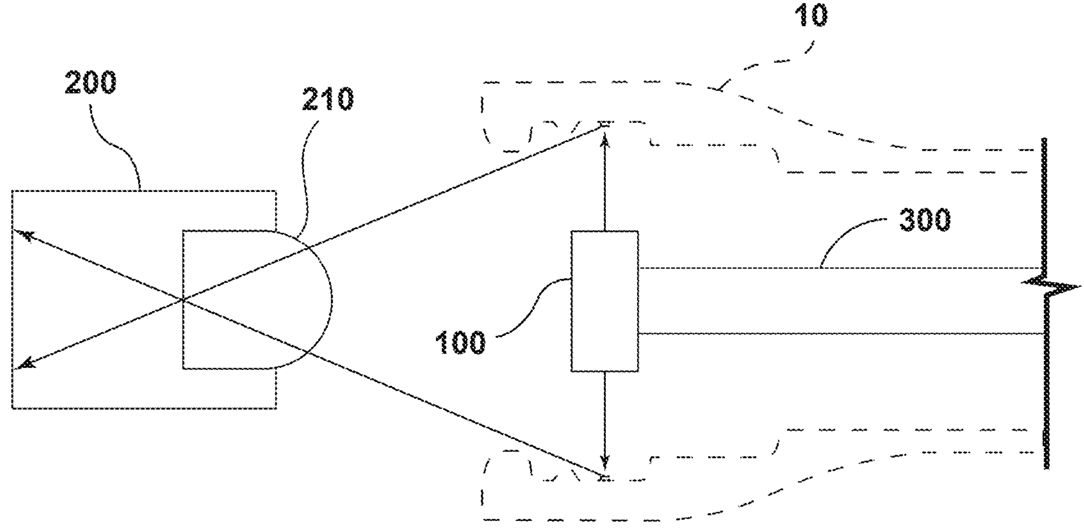
FIG. 1 is a side perspective view of a pipe measurement apparatus, including a partially sectioned view of a pipe to be measured, in accordance with a preferred embodiment described herein.

FIG. 1 is a side perspective view of a preferred embodiment of a pipe measurement apparatus, including a partially sectioned view of a pipe to be measured. The apparatus includes a laser mount 100, a camera 200, and an arm 300. FIG. 1 also shows in section a pipe 10 with an interior surface to be measured. As shown, the laser mount 100 is positioned within the pipe 10 during measurement, as further described herein. The following description therefore generally describes the laser mount 100 when positioned in the interior of the pipe 10.

Figure 2:
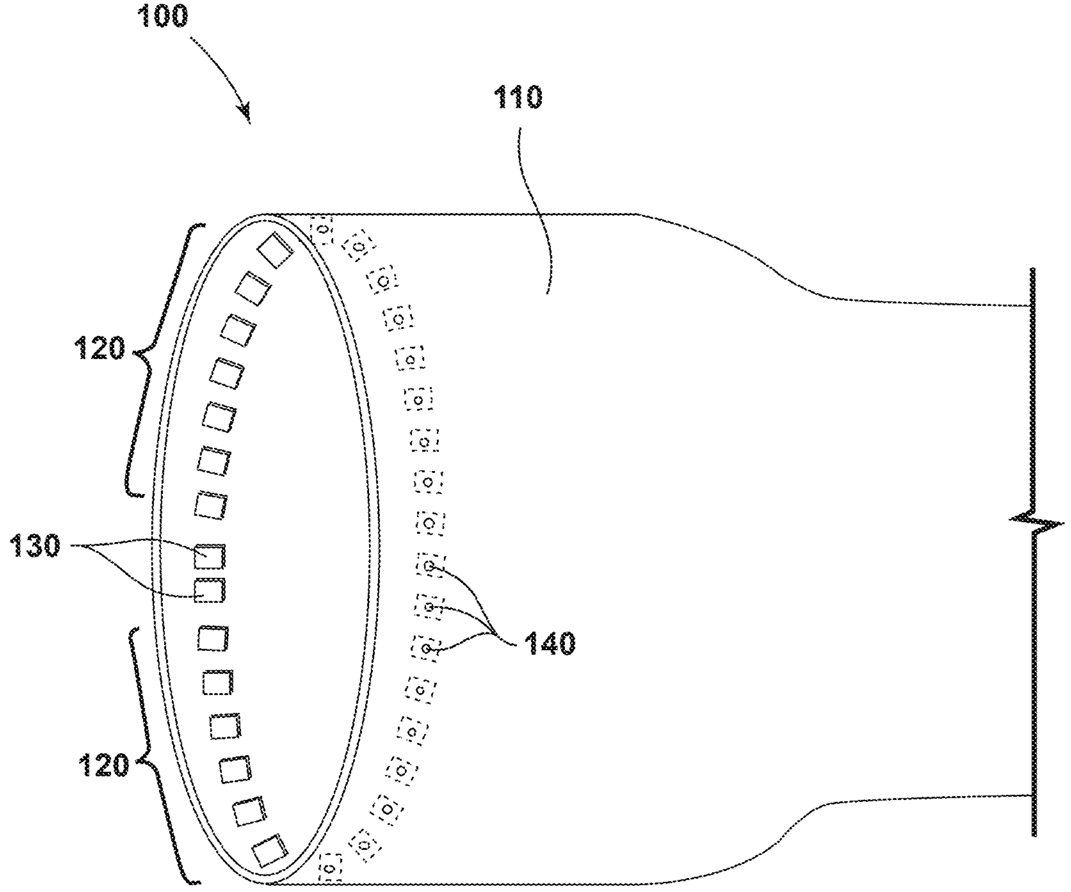
FIG. 2 is a perspective view of a laser array of the embodiment of FIG. 1, in accordance with an embodiment of the apparatus described herein.
Figure 3:
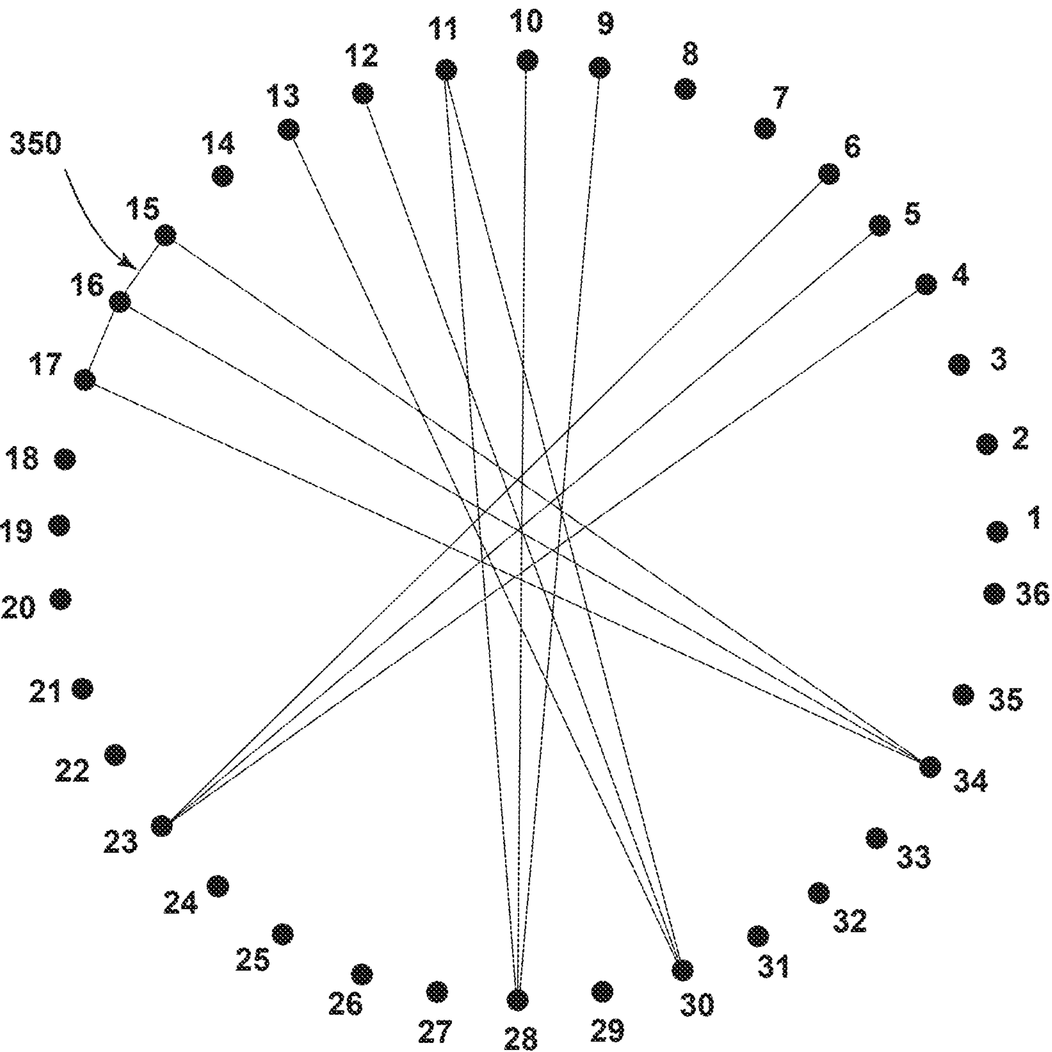
FIG. 3 is a diagram of the points of light projected by the laser array on the interior surface of a pipe, as viewed by the camera, in accordance with an embodiment of the apparatus described herein.

The laser diode mount 100, shown in more detail in FIG. 2, includes a base 110 to which two sets of lasers 120 and 130 are mounted. As used herein, laser refers to any light emitting device capable of projecting a point (or dot or discreet spot) of light on a surface detectable by an image capture device. In a preferred embodiment, the lasers of sets 120 and 130 are laser diodes. Any other type of laser suitable for the application described herein could be used. The first set of lasers 120 is an array of lasers oriented radially, comprising at least four lasers, where three of the radial lasers are positioned to project upon the interior surface of the pipe points of light consecutively spaced proximate to one another and the fourth laser is positioned to project a point of light on the approximately the opposite side of the pipe's interior. The lasers of the first set 120 may be referred to as radial lasers or the radial laser array 120. The radial laser array 120 may include as many lasers as needed to obtain the desired precision or measurement resolution for a given embodiment. In a preferred embodiment, the radial laser array 120 includes thirty-two lasers, substantially equally paced circumferentially around the base 110, oriented such that each laser projects light radially to cause a point of light upon the interior surface of the pipe. The second set 130 includes two parallel lasers oriented and configured to project two points of light upon the interior surface of the pipe a predetermined distance apart. The lasers of the second set may be referred to as parallel lasers 130. Although more than two lasers may be used in the second set 130 (so long as they project light on parallel paths), two lasers projecting parallel beams of light are both necessary and sufficient. The distance separating the parallel lasers and the resultant distance between the points of light projected by them is and will remain fixed, regardless of the distance between the laser diode mount 100 and the surface to be measured. The specific spacing will vary by application, and for example may be 0.5 inches. The radial and parallel lasers are mounted to mount 100 and oriented such that the points of light projected by both the sets of lasers are coplanar. In some embodiments, the lasers are mounted to the interior of the base 110 and the beam of light projects outwardly through apertures 140. In other embodiments, the lasers mounted to the exterior surface of the base 110, such that no aperture is necessary. FIG. 3 is a schematic of the points of light projected by sets of lasers As shown in FIG. 1, the laser diode mount 100 is preferably attached to an arm 300 that is movable longitudinally generally along the axis of the pipe 10. In a preferred embodiment, the arm 300 is (or is itself mounted to or controlled by) a robot or other suitable mechanism to position and hold the laser diode mount 100 in a desired position. The arm 300 and its attachment to the laser diode mount should maintain the coplanar orientation of the points of light projected by the first set 120 and second set 130 of lasers. The center of the laser diode mount 100 need not be at the precise center of the pipe.

FIG. 1 also illustrates (in a conceptual, schematic view) a camera 200. The camera 200 may be any device capable of capturing an image of the points of light projected by the sets of lasers 120 and 130. The camera 200 is positioned longitudinally apart from the laser diode mount 100, and when the surface of the pipe to be measured is near the end of the pipe, the camera may be positioned outside of the opening of the pipe 10, as shown in FIG. 1. If desired, the camera 200 may be mounted to a movable arm, stand, or other support (not shown) to optimally position it with respect to the location of the laser diode mount 100 and array of points of light projected by it. In a preferred embodiment, the camera 200 is a digital camera with a fish-eye lens 210 having a field of view that encompasses the of the points of light projected on the interior surface of the pipe. The camera preferably is operably coupled to a computer or other processing device (not shown) to receive an image from the camera and process it, as described herein. Although image transfer to a computer could be handled manually, it is preferred that the camera and computer be in substantially real-time electronic communication.

Figure 4:
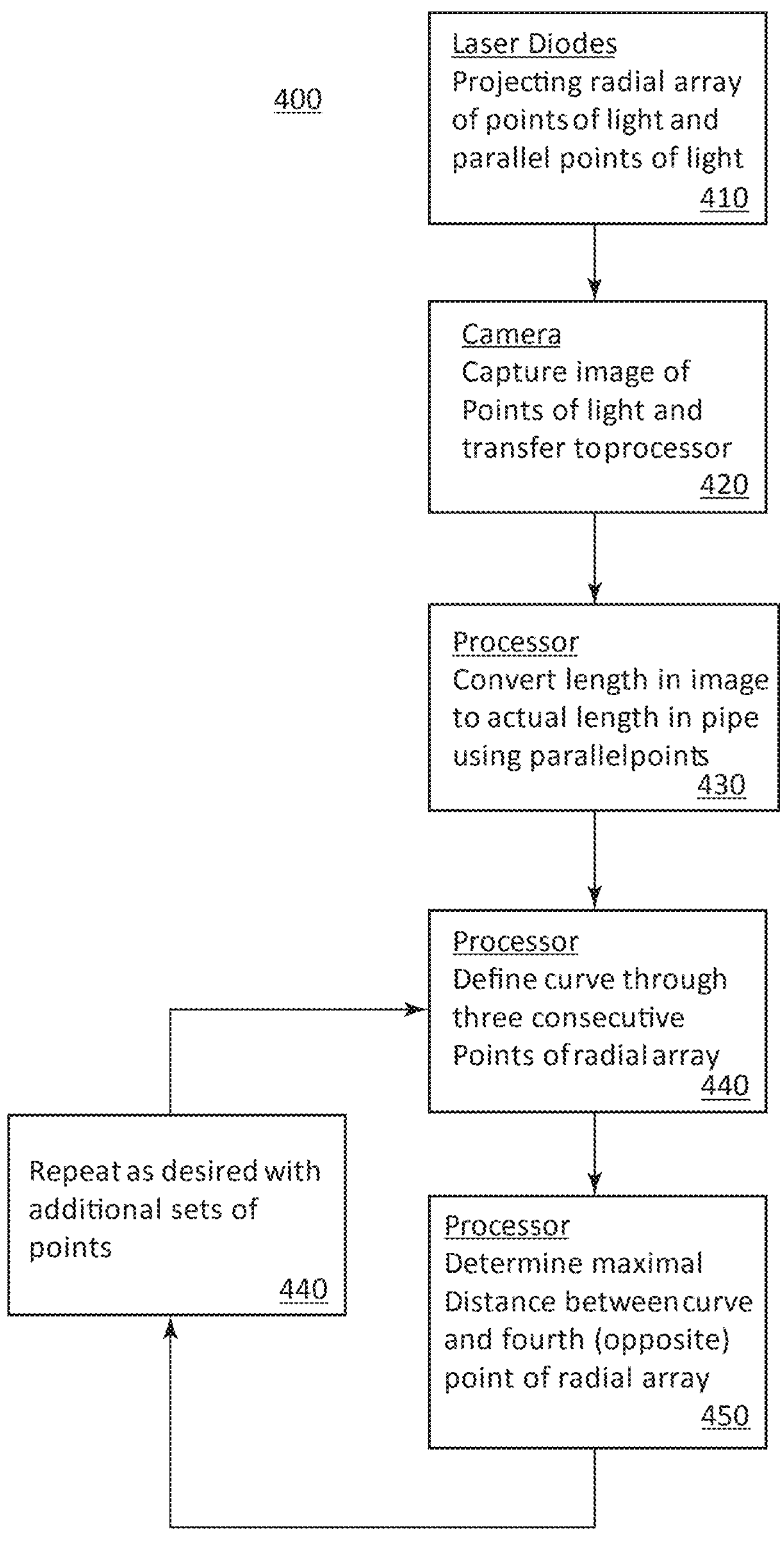
FIG. 4 is a flow diagram illustrating the steps of measuring the interior surface of a pipe, in accordance with an embodiments of the methods described herein.

FIG. 4 is a flow chart of an embodiment a method 400 of measuring the interior surface of a pipe using the apparatus described above. As set forth below, the measurement method includes capturing an image of the three dimensional pipe including the array of points of light, which is converted to a two dimensional array (schematically shown in FIG. 3) via the camera and processor, and analyzing the image using the parallel points for calibration to determine the dimensions of the interior surface of the pipe on the plane on which the points of light were projected.

As shown in FIG. 4, in step 410, the radial laser array 120 and the parallel lasers 130 are actuated to cause them to project points of light upon the interior surface of the object to be measured. In step 420, the camera 200 captures an image of the points of light and transfers it to a processor.

The processor is configured with software to process the image and analyze the digital image mathematically, such as MATLAB. As shown in FIG. 3, points 2 through 35 are projected by the radial laser array 120. Points 1 and 36 are projected by the parallel lasers 130 and are a predetermined and known distance apart, as described above. These points are used to provide calibration data to convert the known physical distance between these parallel points on the pipe's surface to pixels (or other unit of space or dimension) in the two dimensional plane of the image captured by the camera.

In step 440, the processor defines a curve 350 through at least one set of three consecutive points of the radial array, as illustrated by the curve 350 connecting points 15, 16, and 17 in FIG. 3. In one embodiment, Lagrangian polynomials are calculated from each set of consecutive points projected by the radial laser array 120. This results in a polynomial equation defining a curve between each set of three radial points. A fourth point projected by the radial laser array 120 substantially opposite each set of three consecutive points is identified.

In step 450, the diameter of the pipe is determined by calculating the maximal distance from the curve to the fourth point. An infinite number of data points could be used in theory. The actual number of data points (and therefore the number of lasers in the radial laser array 120) will be determined based upon the needs of a given application. By repeatedly defining curves between sets of three consecutive points and the calculating the maximal distance from each curve to a radial point opposite it, the contour or shape of the interior surface of the pipe on the plane of the points of light projected by the radial laser array 120 and parallel lasers 120 can be determined. Because of the mathematics involved, the laser diode array 100 does not need to be centered in the pipe, as noted above, nor do the camera 200 and laser diode array 100 need to be on the same longitudinal axis.

The laser diode mount may be moved longitudinally along the axis of the pipe to repeat the process to measure other planar sections of the pipe's interior surface. By moving the laser diode mount 100 with a robotic arm 300 in defined increments and repeating the method 400 at each location, the shape of the interior of a pipe having a complex profile, as shown in FIG. 1 can be measured and mapped. This as-built map of the pipe's interior surface can then be compared to the design specifications for quality control or other purposes, and irregularities can be used to identify and correct issues in the manufacturing process.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment and should be understood to mean "one or more but not necessarily all embodiments" unless expressly specified otherwise.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the present invention have been illustrated in the accompanying drawings and described in the foregoing detailed description, it will be understood that the invention is not limited to the embodiments disclosed, but is capable of numerous improvements, rearrangements, modifications, and substitutions without departing from the spirit of the invention as set forth herein. All such improvements, rearrangements, modifications, and substitutions are considered within the scope of the concepts disclosed herein and in the claims that follow.

Furthermore, the described features, structures, or characteristics of the disclosure may be combined in any suitable manner in one or more embodiments. In the description contained herein, numerous specific details are provided to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

What is claimed is:

1. An apparatus for measuring an interior surface of a pipe, said pipe a longitudinal axis, comprising:

an array of radial lasers comprising at least four lasers oriented radially with respect to the longitudinal axis of the pipe and disposed upon a mount adapted to be positioned axially within the pipe, wherein three of the radial lasers are positioned to project upon the interior surface of the pipe points of light consecutively spaced proximate to one another and the fourth laser is positioned to project a point of light substantially diametrically opposed thereto, forming a radial array of points of light;

two parallel lasers disposed upon the mount oriented parallel to one another, the parallel lasers configured to project two points of light upon the interior surface of the pipe a predetermined distance apart, wherein the points of light projected by the radial lasers and parallel lasers are coplanar;

a camera positioned to capture an image of the points of light projected by the radial laser array and the parallel lasers; and a processor configured to:

convert length in the image to length along the interior surface of the pipe using the predetermined distance between the two parallel points;

from the image, define a curve connecting the three consecutive points of the radial array; and determine a maximal distance between the curve and the fourth point of the radial array, wherein the maximal distance is the diameter of the pipe.

2. The apparatus of claim 1, wherein the mount is movable longitudinally along a path parallel to the axis of the pipe.

3. The apparatus of claim 2, where in the mount is attached to a robotic arm.

4. The apparatus of claim 1, wherein the camera captures the image through a fish-eye lens.

5. The apparatus of claim 1, wherein the array comprises a plurality of sets of at least four lasers, and the processor is configured to repeating the defining step and the determining step for each of the sets.

6. The apparatus of claim 5, wherein the sets are nonexclusive.

7. The apparatus of claim 6, wherein the array comprises 32 lasers.

8. The apparatus of claim 1, wherein length in the image is defined in pixels.

9. The apparatus of claim 1, wherein the curve is defined using Lagrangian polynomials.

10. A method of measuring an interior surface of a pipe, said pipe having a longitudinal axis, comprising:

projecting upon the interior surface of the pipe an array of at least four points of light radially spaced apart, forming a radial array of points of light, wherein three of the radial points are consecutively spaced proximate one another and the fourth point is substantially diametrically opposed thereto;

projecting upon the interior surface of the pipe from parallel sources two points of light a predetermined distance apart;

capturing an image of the radial array and the parallel points of light;

converting length in the image to length along the interior surface of the pipe using the predetermined distance between the two parallel points;

from the image, defining a curve connecting the three consecutive points of the radial array; and determining a maximal distance between the curve and the fourth point of the radial array, wherein the maximal distance is the diameter of the pipe.

11. The method of claim 10, wherein the array comprises a plurality of sets of at least four points of light, and repeating the defining step and the determining step for each of the sets.

12. The method of claim 11, wherein the sets are nonexclusive.

13. The method of claim 12, wherein the array comprises 32 points of light.

14. The method of claim 10, wherein length in the image is defined in pixels.

15. The method of claim 10, wherein the curve is defined using Lagrangian polynomials.

16. The method of claim 10, wherein the each step of the process is repeated at a plurality of locations along the longitudinal axis of the pipe.

* * * * *